No. 685,364. Patented Oct. 29, 1901.
W. G. WILLIAMSON.
TIRE TIGHTENER.
(Application filed July 5, 1901.)

(No Model.)

Witnesses
F. E. Allen.
H. G. Shepard.

W. G. Williamson, Inventor
by C. A. Snow & Co.
Attorneys

UNITED STATES PATENT OFFICE.

WILLIAM G. WILLIAMSON, OF ABBOTT, FLORIDA.

TIRE-TIGHTENER.

SPECIFICATION forming part of Letters Patent No. 685,364, dated October 29, 1901.

Application filed July 5, 1901. Serial No. 67,222. (No model.)

*To all whom it may concern:*

Be it known that I, WILLIAM G. WILLIAMSON, a citizen of the United States, residing at Abbott, in the county of Pasco and State of Florida, have invented a new and useful Tire-Tightener, of which the following is a specification.

This invention relates to tire-tighteners, and has for its object to provide an improved device of this character which is arranged to adjustably connect the opposite ends of felly-sections, so as to force the same apart to tighten the rim or felly within the tire. It is furthermore designed to arrange for applying the device to wheels already in use without altering or changing the same, to brace the tire where it spans the joint between the felly-sections, to effectually protect and house the device against the lodgment of dirt, and finally to arrange for the convenient adjustment to tighten the tire whenever desired.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
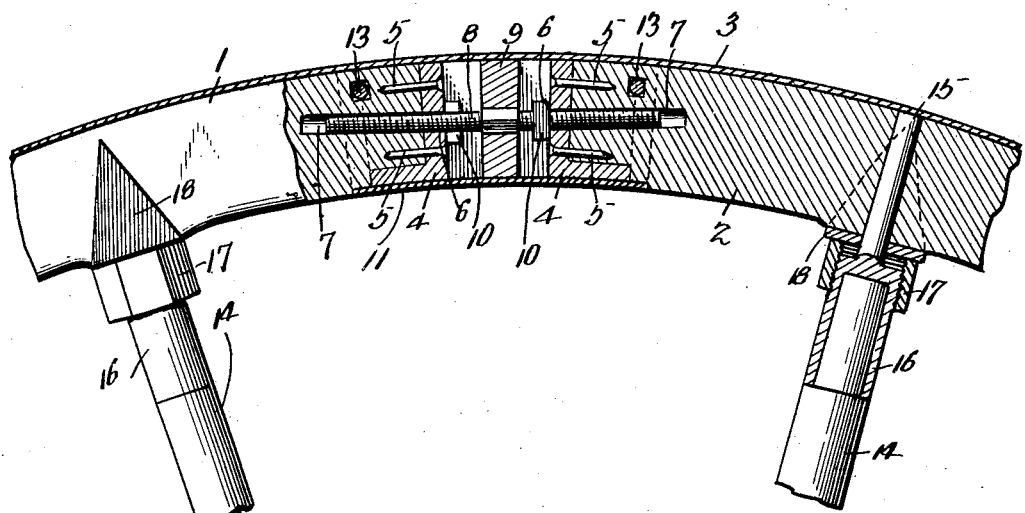
Figure 2:
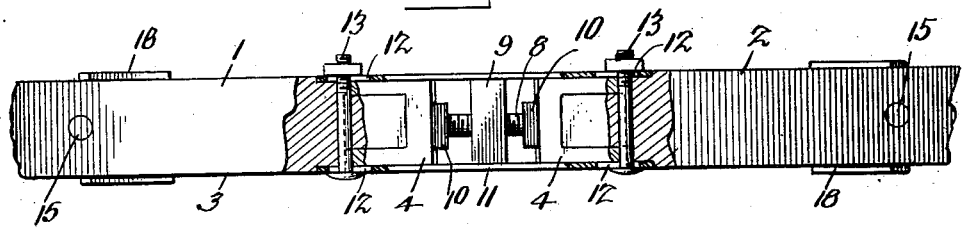
Figure 3:
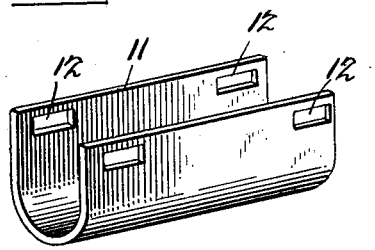
Figure 4:
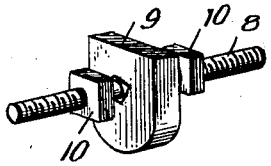

In the drawings, Figure 1 is a sectional elevation of a portion of a wheel having the present invention applied thereto. Fig. 2 is a plan view thereof, the tire being removed and parts broken away to show the fastening means. Fig. 3 is a detail perspective view of the housing or casing of the device. Fig. 4 is a detail perspective view of the adjusting portion of the device.

Like characters of reference designate corresponding parts in all of the figures of the drawings.

Referring to the drawings, 1 and 2 designate opposite rim or felly sections, which are bound by the usual metallic tire 3. The end of each rim-section is protected by means of a metallic clip 4, which embraces the opposite sides and inner edge of the rim and is held thereto by means of fastenings 5, driven through the clip and into the end of the rim. The central portion of the clip is provided with a perforation 6, which registers with a straight socket 7, formed in the rim-section. The opposite ends of a screw-threaded rod 8 are loosely fitted in the sockets of the respective rim-sections, and an intermediate block or shoulder 9 is fixed to the rod with its outer flat edge flush with the outer marginal edge of the rim and its inner edge also flush with and conforming to the shape of the inner edge of the rim. At opposite sides of the shoulder there are provided the tightening or adjusting nuts 10, which are designed to be set up against the adjacent rim ends, so as to force the same apart, thereby to tighten the rim within the tire as the rim-sections slip outwardly in opposite directions from the end portions of the screw-threaded rod 8, the tire being in the form of a solid ring and the diameter of the felly being expanded so as to bind tightly within the same.

A substantially semitubular metallic casing 11 embraces the inner edge and opposite sides of the rim-joint, so as to cover and house the tightening device, and is provided at opposite ends with corresponding longitudinal slots 12 for the reception of the fastenings 13, that pierce the rim, and thereby hold the casing in place, the slots being designed to accommodate for the slight movement of the rim-sections when being tightened.

It will be here observed that the tire covers the outer side of the joint, and the block or shoulder 9 forms a brace or support for the tire where it spans the joint between the rim-sections, said block or shoulder being of a form similar to the contour of the felly in cross-section and its rear rounded face being supported by the semitubular metallic casing 11.

Each spoke 14 is provided with a metallic pin or tenon 15, which enters a corresponding opening in the rim and is carried by a socket or ferrule 16, that snugly fits the outer end of the spoke and has its outer end portion externally screw-threaded for the reception of a polygonal tightening-collar 17, which is designed to be set against the rim and take up any looseness between the spoke and the rim. For the protection of the wooden rim against the collar there is provided a substantially U-shaped metallic clip 18, that embraces the rim and has an opening for the reception of the tenon.

To adjust the device, it is merely necessary to remove the casing or housing, thereby exposing the nuts, which are turned to feed outwardly in opposite directions, and thereby force apart the rim-sections to tighten the tire, after which the casing is replaced to protect the device against lodgment of dirt.

What is claimed is—

1. The combination with opposite rim-sections, having corresponding sockets in the adjacent ends thereof, and a solid tire embracing the rim-sections, of a fixed screw-threaded rod having its opposite ends loosely fitted in the respective sockets, an intermediate fixed shoulder upon the rod and forming a support for the adjacent portion of the tire, and adjusting-nuts applied to the rod at opposite sides of the shoulder and lying against the ends of the respective rim-sections.

2. A tire-tightener of the class described, comprising a substantially semitubular casing, a fixed screw-threaded rod to lie longitudinally within the casing, an intermediate fixed shoulder carried by the rod and shaped to snugly fit the casing and to bear against the tire, and adjusting-nuts applied to the rod at opposite sides of the shoulder, the ends of the casing being provided with corresponding longitudinal slots for the reception of fastenings.

3. In a device of the class described, the combination with a solid tire, of a felly having spaced ends, a block 9 of a contour similar to that of the felly in cross-section and adapted to fit between said spaced ends and form a support for the tire, a rod fixed in said block 9 and having its opposite ends provided with screw-threads adapted to straight unthreaded sockets formed in the ends of the felly, adjusting-nuts applied to the rod at opposite sides of said block and bearing against the ends of said felly, and a casing shaped to conform to the felly and fitting over the end portions of the felly and the intermediate block, substantially as specified.

In testimony that I claim the foregoing as my own I have hereto affixed my signature in the presence of two witnesses.

WILLIAM G. WILLIAMSON.

Witnesses:
 W. M. GEIGER,
 H. A. PHELPS.